United States Patent
Tahara et al.

[11] Patent Number: 5,908,899
[45] Date of Patent: Jun. 1, 1999

[54] RESIN COMPOSITION FOR SEALING LIQUID CRYSTAL CELLS

[75] Inventors: Shuji Tahara, Ichihara; Shigeo Makino, Chiba; Kenji Ito, Mobara; Seiji Itami, Chosei-gun; Hiromi Shitakoji, Tokyo, all of Japan

[73] Assignee: Mitsui Chemicals, Inc., Tokyo, Japan

[21] Appl. No.: 08/767,882

[22] Filed: Dec. 17, 1996

[30] Foreign Application Priority Data

Dec. 27, 1995 [JP] Japan .................................. 7-340476

[51] Int. Cl.⁶ ................................................... C08F 265/02
[52] U.S. Cl. ........................... 525/301; 525/302; 525/307; 525/308; 525/309; 525/303; 525/312; 525/454; 525/455; 525/476
[58] Field of Search ..................... 525/301, 302, 525/307, 308, 309, 312, 303, 454, 455, 476

[56] References Cited

U.S. PATENT DOCUMENTS 5,079,047  1/1992  Bogaert et al. ............................ 428/41

FOREIGN PATENT DOCUMENTS

| | | |
|---|---|---|
| 55-16053 | 2/1980 | Japan . |
| 55-21432 | 2/1980 | Japan . |
| 57-137317 | 8/1982 | Japan . |
| 59-137929 | 8/1984 | Japan . |
| 60-72957 | 4/1985 | Japan . |
| 61-36317 | 2/1986 | Japan . |
| 61-34477 | 8/1986 | Japan . |
| 1-243029 | 9/1989 | Japan . |
| 1-254786 | 10/1989 | Japan . |
| 3-170523 | 7/1991 | Japan . |
| 3-188186 | 8/1991 | Japan . |
| 6-73164 | 3/1994 | Japan . |
| 6-75231 | 3/1994 | Japan . |

*Primary Examiner*—Edward J. Cain
*Attorney, Agent, or Firm*—Burns, Doane, Swecker & Mathis, L.L.P.

[57] ABSTRACT

A resin composition for sealing liquid crystal cells which contains as essential components a rubber-modified unsaturated compound obtained by grafting a monomer having at least one polymerizable ethylenically unsaturated bond in a molecule with at least one rubber selected from acrylic rubber, silicone rubber, urethane rubber and conjugated diene rubber, and a coupling agent, a filler and a photopolymerization initiator. The rubber contained in the rubber modified unsaturated compound has a particle diameter of 0.2–5 μm and a number average molecular weight of 1000–100,000, and the rubber content in the compound is 0.5–45% by weight based on the rubber modified unsaturated compound.

5 Claims, No Drawings

RESIN COMPOSITION FOR SEALING LIQUID CRYSTAL CELLS

BACKGROUND OF THE INVENTION

(1) Field of the Invention

The present invention relates to a resin composition for sealing liquid crystal cells, more specifically to a novel UV-curing type resin composition for sealing liquid crystal cells, which can be used under diversification of displays in recent years and severe environment and which is suited for sealing liquid crystal displays to which high reliability is required.

(2) Description of the Related Art

In recent years, improvements in electronics has rapidly been advanced mainly in personal computers, sound equipment, measuring instruments and color televisions. As a result, display systems using liquid crystals have widely been adopted. This is considered as being due to characteristics such as very small power consumption, low driving power, sufficient sharpness even under sun light and sharp contrast between light and shade, and due to the facts that miniaturization and light weight have been effectuated and low prices have been achievable and that a coloring technique using liquid crystals has reached such level as excels a Braun tube (CRT). Because of such advantages, the application fields of liquid crystal displays (LCD) have been going to a phase of increasing expansion.

This phase has been followed by active investigations on an elevation in the quality of LCD and an enhancement in productivity. Above all, a reduction in curing temperatures in a production process of a liquid crystal cell and maintenance of high reliability as well as shortening of a curing time have strongly been desired. This contributes largely to energy saving in producing liquid crystal cells and a reduction in production costs and prices of the products.

Epoxy resins are usually used for resins for sealing liquid crystal. In former times, two liquid hot-setting type epoxy resins were used, and used at present are single liquid hot-setting type epoxy resins (for example, Japanese Patent Laid-Open No. Sho 57-137317, Japanese Patent Laid-Open No. Sho 59-157330, Japanese Patent Laid-Open No. Hei 6-75231 and Japanese Patent Laid-Open No. Hei 6-73164). On the other hand, in recent years, UV-setting type acrylic adhesives and epoxy adhesives have been investigated, and, for example, UV-setting type acrylic adhesives are disclosed in Japanese Patent Laid-Open No. Sho 59-137929, Patent Laid-Open No. Hei 1-243029 and Patent Laid-Open No. Hei 3-188186, and UV-setting type epoxy adhesives are disclosed in Japanese Patent Laid-Open No. Sho 61-34477 and Patent Laid-Open No. Hei 1-254786.

However, the fact is that any of these adhesives can not sufficiently satisfy requirements such as a reduction in a curing temperature, shortening of a curing time and high reliability. That is, in the case of two liquid epoxy resins, since the pot life is short and the viscosity is liable to increase, the workability, yield and productivity are inferior. Even in the case of currently prevailing single liquid hot-setting type epoxy resins, a curing time of 60 minutes or longer at a temperature of 150° C. is usually needed, and when they are cured at a further lower temperature of 130° C., it takes a long time of 2 hours or more until needed performances are revealed. Accordingly, they are not suited for shortening of a curing time.

In the case of existing UV-curing type acrylic adhesives, a reduction in the curing temperature and shortening of the curing time are possible, but the workability and the pattern maintenance are inferior. Further, as revealed in a reliability test is the problem that the moisture resistance and the adhesive property are not sufficient. UV-curing type epoxy adhesives have hardly been put into practical use because of the problem of electrode corrosion as well as almost the same reasons as described above.

SUMMARY OF THE INVENTION

A resin composition for sealing liquid crystal cells (hereinafter called a sealant) has functions to seal a liquid crystal between two transparent substrates equipped with electrodes and to adhere the two substrates strongly. In this case, performances required by the sealant are mainly:

(1) high adhesive property with the substrate,
(2) no reactivity with the liquid crystal,
(3) resistances to high temperatures and high humidity,
(4) excellent screen printing property, and
(5) excellent insulating property.

However, at present any sealant does not satisfy these properties.

In general, in order to satisfy the requirement (1), the first method includes the use of linear unsaturated compounds and the addition of plasticizers and flexibility-providing agents. However, while the adhesive strength is relatively improved, the elastic modulus is lowered, and the toughness is low. In addition, there are the problems that the glass transition point is reduced and the strength at a high temperature is decreased.

The second method includes a method in which liquid rubber or solid rubber particles are blended. However, in the case where rubber is different in affinity from a resin, energy absorptivity is reduced or it is difficult to control a particle diameter of rubber particles, and therefore it is difficult to design the resin.

The third method includes the blend of a powder polymer. Involved in this method is the problem that affinity between the powder polymer (usually, engineering plastics such as PES, PEEK and the like) and the resin is low and therefore an energy absorptivity is not sufficient.

In the first to third methods, it is a fatal defect that the particles cannot be controlled when the sealant is used for a liquid crystal display. Because in the case of a liquid crystal display, an adhesion thickness (thickness of a space in which liquid crystal is sealed) is usually 5 to 7 $\mu$m, and if particles having larger particle diameters than this are present, regions where only large rubber particles are present are formed in a sealing part, which brings about an extreme reduction in the performance or in the worst case, makes it impossible to prepare a liquid crystal cell.

The subject of the present invention is to provide a resin composition for sealing liquid crystal cells which has a high reliability and is excellent particularly in a moisture resistance and an adhesive property, and which satisfies the above-mentioned (1)–(5), wherein in a production process of a liquid crystal cell, the workability is good; curing proceeds at a low temperature in a short time; the yield and the productivity are improved; and these achieve energy saving and low cost.

Intensive investigations made by the present inventors in order to solve the problems described above have resulted in finding the fact that in a UV-curing type resin composition a rubber-modified unsaturated compound grafted with a specific rubber component is effective, and thus completing the present invention.

That is, the present invention includes the fourth method to satisfy the requirements described above. The method facilitates the selection of a base resin and makes it possible to control the affinity and to easily carry out blending and dispersing of rubber at room temperature. Since in the composition of the present invention the rubber is graft-polymerized with a resin to form a kind of an alloy, energy can directly be transmitted, and therefore the composition is suited to stress relaxation. In addition thereto, the particle diameter can be controlled and therefore the optimum energy absorptivity can be revealed.

As for the characteristics of the present invention, a rubber component is not used only for the purpose to provide the composition with a high adhesive property, it is intended to satisfy the required performance (3) at the same time. That is, as described above, it is intended to satisfy the functions of both the adhesive and the sealant at the same.

The performances (1) to (3) required by the sealant are to increase an adhesive property in an interface between the substrate and the sealant and to prevent water from penetrating from the interface. The sealant itself has to be such that it is difficult for moisture to penetrate thereinto. In a face where the sealant contacts liquid crystal, no reaction with the liquid crystal has to take place.

In the sealant of the present invention, a composition using a rubber-modified unsaturated compound reveals a stress relaxation ability in the interface at the maximum and raises an adhesive strength in the interface, whereby an adhesion in the interface is enhanced, which have resulted in successfully suppressing the penetration of moisture to a minimum. It can be seen from the examples mentioned later that the higher the adhesive strength is, the better the electric characteristics become. To be more specific, the air vent and the defoaming performance after screen printing are increased, and as shall be explained in Examples 1 to 5, all performances are improved.

The present invention relates to:

(1) a resin composition for sealing liquid crystal cells characterized by containing a rubber-modified unsaturated compound obtained by grafting a monomer having at least one polymerizable ethylenically unsaturated bond in a molecule with at least one rubber selected from acrylic rubber, silicone rubber, urethane rubber and conjugated diene rubber, and a coupling agent, a filler and a photopolymerization initiator as essential components, (2) the resin composition for sealing liquid crystal cells as described in (1), wherein the rubber contained in the rubber-modified unsaturated compound has a particle diameter of 0.2 to 5.0 µm, (3) the resin composition for sealing liquid crystal cells as described in (1), wherein the rubber contained in the rubber-modified unsaturated compound has a number average molecular weight of 1,000 to 100,000, (4) the resin composition for sealing liquid crystal cells as described in (1), wherein the rubber-modified unsaturated compound has a rubber content of 0.5 to 45.0% by weight based on the weight of the rubber-modified unsaturated compound, and further the present invention relates to (5) a liquid crystal display panel, wherein a liquid crystal composition is sealed between two transparent substrates equipped with electrodes, and the peripheries of the substrates are adhered with the resin composition for sealing liquid crystal cells as described above.

The composition of the present invention has a good workability, and the liquid crystal display panel having a high reliability can be prepared by curing with radiation of UV rays at a low temperature for a short time. Further, this contributes greatly to energy saving and reduction in cost.

DETAILED DESCRIPTION OF the PREFERRED EMBODIMENTS

The rubber-modified unsaturated compound used in the present invention may be any one as long as it composes a resin composition capable of forming a so-called sea/island structure in which rubber particles are dispersed in a resin layer after a UV curing type resin composition is cured. That is, it is a compound obtained by graft-polymerizing an unsaturated compound with rubber.

The unsaturated compound may be any one as long as it has acrylic acid, methacrylic acid or a vinyl ether derivative in a skeleton and has at least one unsaturated group in a molecule. The specific examples thereof shall be shown below by dividing them into groups: (1) compounds having one unsaturated group, (2) compounds having two unsaturated groups and (3) compounds having three or more unsaturated groups. However, the present invention shall not be restricted thereby.

(1) Monoacrylate compounds: methyl acrylate, ethyl acrylate, n-propyl acrylate, n-butyl acrylate, benzyl acrylate, cyclohexyl acrylate, isoamyl acrylate, lauryl acrylate, butoxyethyl acrylate, ethoxydiethyleneglycol acrylate, methoxytriethyleneglycol acrylate, phenoxyethyl acrylate, phenoxypolyethyleneglycol acrylate, tetrahydrofurfuryl acrylate, isobornyl acrylate, 2-hydroxyethyl acrylate, 2-hydroxypropyl acrylate, 2-hydroxy-3-phenoxypropyl acrylate and 2-acryloyloxyethyl-2-hydroxyethylphthalic acid.

Monomethacrylate compounds: methyl methacrylate, ethyl methacrylate, n-propyl methacrylate, n-butyl methacrylate, benzyl methacrylate, cyclohexyl methacrylate, isoamyl methacrylate, lauryl methacrylate, butoxyethyl methacrylate, ethoxydiethyleneglycol methacrylate, methoxytriethyleneglycol methacrylate, phenoxyethyl methacrylate, phenoxypolyethyleneglycol methacrylate, tetrahydrofurfuryl methacrylate, isobornyl methacrylate, 2-hydroxyethyl methacrylate, 2-hydroxypropyl methacrylate, 2-hydroxy-3-phenoxypropyl methacrylate and 2-methacryloyloxyethyl-2-hydroxyethylphthalic acid.

Monovinyl ether compounds: n-butyl vinyl ether, benzyl vinyl ether, cyclohexyl vinyl ether, isoamyl vinyl ether, lauryl vinyl ether, butoxyethyl vinyl ether, ethoxydiethyleneglycol vinyl ether, methoxytriethyleneglycol vinyl ether, phenoxyethyl vinyl ether, phenoxypolyethyleneglycol vinyl ether, tetrahydrofurfuryl vinyl ether, isobornyl vinyl ether, 2-hydroxyethyl vinyl ether, 2-hydroxypropyl vinyl ether, 2-hydroxy-3-phenoxypropyl vinyl ether and 2-vinyloxyethyl-2-hydroxyethylphthalic acid.

(2) Diacrylate compounds: diol diacrylates such as ethyleneglycol diacrylate, 1,6-hexanediol diacrylate; bisphenol A diacrylates such as ethylene oxide-modified bisphenol A diacrylate; and dimethyloltricyclodecane diacrylate.

Dimethacrylate compounds: diol dimethacrylates such as ethyleneglycol dimethacrylate, 1,6-hexanediol dimethacrylate; bisphenol A dimethacrylates such as ethylene oxide-modified bisphenol A dimethacrylate; and dimethyloltricyclodecane dimethacrylate.

Divinyl ether compounds: diol divinyl ethers such as ethyleneglycol divinyl ether, 1,6-hexanediol divinyl ether; bisphenol A divinyl ethers such as ethylene oxide-modified bisphenol A divinyl ether; and dimethyloltricyclodecane divinyl ether.

(3) Multifunctional acrylate compounds: trimethylolpropane triacrylate, pentaerythritol triacrylate, pentaerythritol tetraacrylate and dipentaerythritol hexaacrylate.

Multifunctional methacrylate compounds: trimethylolpropane trimethacrylate, pentaerythritol trimethacrylate, pentaerythritol tetramethacrylate and dipentaerythritol hexamethacrylate.

Multifunctional vinyl ether compounds: trimethylolpropane trivinyl ether, pentaerythritol trivinyl ether, pentaerythritol tetravinyl ether and dipentaerythritol hexavinyl ether.

In addition to them, any compound can be used as long as it is urethane-modified or silicone-modified unsaturated compound. These compounds may be used in the form of a mixture of two or more kinds thereof, if necessary.

In the present invention, as a method for dispersing the rubber particles in obtaining the rubber-modified unsaturated compound, the rubber particles may be dispersed in the unsaturated compounds described above, or the rubber particles may be dissolved in unsaturated compounds and then deposited in curing. There can be used as well a method in which rubber particles are formed in an unsaturated compound while forming a graft copolymer with a part of the unsaturated compound. Preferred is a method in which a particle diameter of rubber is easily controlled, for example, a method in which rubber particles are formed in an unsaturated compound while forming a graft copolymer with a part of the unsaturated compound.

In these methods, interaction is present in the interfaces between the rubber particles and the unsaturated compounds, and the particles are stably dispersed. If the interaction is not present in the interfaces between the rubber particles and the unsaturated compounds, coagulation is liable to take place after curing, and it is difficult to maintain a high reliability. Suitably cross-linked rubber is hardly liable to cause the rubber particles to be deformed with stress produced by curing and therefore is preferred.

The acrylic ester rubber with which an unsaturated compound is grafted includes rubber particles obtained by drying a core.shell type emulsion and those disclosed in Japanese Patent Application Laid-Open No. Sho 55-16053 or Japanese Patent Application Laid-Open No. Sho 55-21432.

The silicone rubber includes silicone rubber fine particles, those disclosed in Japanese Patent Application Laid-Open No. Sho 60-72957, Japanese Patent Application Laid-Open No. Hei 7-170523, and those obtained by a method in which a double bond is introduced into an epoxy resin and silicone containing active hydrogen capable of reacting with the double bond is reacted to produce a grafted compound, followed by polymerizing a silicone rubber monomer in the presence of the grafted compound, those obtained by a method in which a double bond is introduced into an epoxy resin and a polymerizable vinyl group-containing silicone monomer is reacted with the epoxy resin to produce a grafted compound and those obtained by a method in which a silicone rubber monomer is polymerized in the presence of the above grafted matter.

The urethane rubber is produced by polymerizing or copolymerizing a so-called monoacrylate (methacrylate) adduct (hereinafter referred to as adduct [A]) of methylenediisocyanate (MDI) obtained by adding hydroxyethyl acrylate (methacrylate) to a part of isocyanate groups contained in MDI and adding a compound having a functional group capable of reacting with isocyanate, such as OH, NH, SH and COOH to the rest of the isocyanate groups.

Preferred for forming the rubber particles is a method in which monomers capable of producing rubber, such as butyl acrylate and 2-ethylhexyl acrylate are polymerized or copolymerized with an acrylate group contained in the adduct [A]. Basically, the same method as used for the silicone rubber is possible, and elasticity and stress relaxation which are characteristics of urethane can be revealed by selecting the isocyanate compounds and polyols. Accordingly, the application field thereof is broadened.

The conjugated diene rubber can be produced by polymerizing or copolymerizing monomers such as, for example, 1,3-butadiene, 1,3-penadiene, isoprene, 1,3-hexadiene and chloroprene. Commercially available products can be used as well. In particular, a copolymer of butadiene having a carboxyl group in a terminal with acrylonitrile and a copolymer of butadiene having an amino group at a terminal with acrylonitrile are dissolved in epoxy resins and cause rubbers to deposit in curing. Accordingly, they are relatively liable to form the rubber particles. However, it is difficult to control the particle diameters, and therefore the insufficient performances are provided in some cases as compared with the acrylic ester rubber and the silicone rubber described above.

These rubber components may be used alone or in combination of two or more kinds thereof.

The rubber component contained in the rubber modified unsaturated compound can form preferably a so-called sea/island structure in which the particles having an average particle diameter of 0.2 to 5.0 $\mu$m, preferably 0.2 to 2.0 $\mu$m are dispersed.

The average particle diameter falling out of the range described above cannot provide a high reliability in the present invention and reduces the performance. The rubber particles having an average particle diameter smaller than 0.2 $\mu$m lowers the stress relaxation. To be specific, in the case where a resin composition which produces a resin having a glass transition point (hereinafter referred to as Tg) of 50° C. or higher by curing is used, sufficient adhesive strength cannot be obtained. Further, the rubber particles having an average particle diameter smaller than 0.2 $\mu$m deteriorate the air vent and the defoaming property. Accordingly, in the case of a screen printing property, the linearity is degraded, and bubbles remain in the resulting cells. In the case of dispenser coating, sealing is disconnected in many spots. The rubber particles having an average particle diameter exceeding 5.0 $\mu$m produce many regions where only the rubber is present in the seal and bring about a reduction in a coagulation power in a resin layer, which results in reducing the adhesive strength. Further, the rubber particles having an average particle diameter exceeding 5.0 $\mu$m increase the regions where only the rubber is present in the seal and reduce a moisture barrier property in the interface and the resin layer, which result in lowering a high temperature and high moisture resistance. Further, the regions where only the rubber is present are increased in the seal, as a result, a cell gap is liable to change.

The rubber in the rubber modified unsaturated compound has a number average molecular weight of 1,000 to 100,000, preferably 5,000 to 50,000.

The rubber modified unsaturated compound has a rubber content of 0.5 to 45.0% by weight, preferably 5 to 25% by weight based on the weight of the rubber modified unsaturated compound.

The particle diameter, the grafted amount and the number average molecular weight of the rubber component depend on the kinds and amounts of the monomers and the oligomers in the acrylic, silicone, urethane and conjugated diene rubbers to be used, and rubber obtained by combining them has to satisfy the range described above.

In the present invention, the use of this rubber modified unsaturated compound is very effective for improving fragility of the cured resin caused by stress relaxation and an increase in a glass transition point (Tg) of the cured resin composition, and as a result, modification to a higher Tg becomes possible.

Next, the coupling agent used in the present invention includes:

(1) vinylsilane coupling agents: vinyltrichlorosilane, vinyltris(β-methoxyethoxy)silane, vinyltriethoxysilane, vinyltrimethoxysilane and γ-methacryloxy propyltrimethoxysilane, (2) allylsilane coupling agents: allyltrichlorosilane, allyltris(β-methoxyethoxy)silane, allyltriethoxysilane and allyltrimethoxysilane, and (3) acryloylsilane coupling agents: acryloyltrichlorosilane, acryloyltris(β-methoxyethoxy)silane, acryloyltriethoxysilane and acryloyltrimethoxysilane.

They may be used alone or in combination of two or more kinds thereof.

The addition amount of these coupling agents changes largely according to the composition of the resin composition used in the present invention. In general, it is preferably 0.2 to 8 parts by weight per 100 parts by weight of the resin composition. An amount of less than 0.2 part by weight does not provide the sufficient adhesive strength and moisture resistance, and an amount exceeding 8 parts by weight reduces the coagulation power and results in bringing about a reduction in the adhesive strength and the reliability.

The filler used in the present invention may be any one as long as it does not impede UV curing, and they may be used alone or in combination of two or more kinds thereof. They include, for example:

(1) inorganic fillers: carbonates such as calcium carbonate and magnesium carbonate; sulfates such as barium sulfate and magnesium sulfate; silicates such as aluminum silicate and zirconium silicate; oxides such as iron oxide, titanium oxide, aluminum oxide and zinc oxide; kaolin, talc, asbestos powder, quartz powder, mica and glass fiber, and (2) organic fillers: polyethylene powder, polypropylene powder, polystyrene powder, polyvinyl acetate powder, polystyrene-vinyl acetate copolymer powder, polymethacrylate powder, polyester powder, phenol resin powder and epoxy resin powder.

The addition amount of these fillers changes largely according to the composition of the resin composition used in the present invention, particularly the kind of the filler itself. In general, it is 1 to 50% by weight, preferably 2 to 25% by weight based on the weight of the resin composition. Since generally the filler also acts as a viscosity controller in the present invention, an amount less than 1% by weight is liable to cause the defects that the coating workability is bad and the property of keeping the coated pattern is inferior. Meanwhile, an amount exceeding 50% by weight is liable to hinder coating by screen printing and extremely lowers the curing property by UV rays.

In blending the filler, the filler is preferably used after being kneaded by means of a three roll mill to be pulverized finely, in order to prevent a screen from being clogged in screen printing.

Further, the photopolymerization initiator used in the present invention shall not specifically be restricted as long as it is decomposed by light having a wavelength ranging from a visible ray region to a UV ray region to produce radical, and this can subject the double bond of the rubber-modified unsaturated compound to ring-opening polymerization. The photopolymerization initiator includes, for example, alkylacetophenones, alkyl phenyl ketones, benzoin alkyl ethers, benzophenones, thioxanthones and anthraquinones. They may be used alone or in combination of two or more kinds thereof.

The addition amount of these photopolymerization initiators is 0.1 to 10.0% by weight, preferably 0.5 to 5.0% by weight based on the weight of the resin composition. An amount exceeding 10.0% by weight reduces the adhesive property and the moisture resistance, and the amount of less than 0.1% by weight makes curing difficult. Accordingly, both are not preferred.

In the present invention, other publicly known additives are allowed to be added, if necessary, as long as they do not damage the effects of the present invention. There can be used if necessary, for example, various additives such as curing accelerators (sensitizers), solvents, pigments, dyes, plasticizers, leveling agents, defoaming agents and reactive diluents.

The resin composition described above is sufficiently kneaded by means of a dispersing equipment such as a three roll mill to obtain the resin composition for sealing liquid crystal cells for the liquid crystal display panel according to the present invention.

The resulting sealant composition is used for preparing a liquid crystal display panel. That is, the sealant composition according to the present invention is applied on a prescribed position of a glass substrate equipped with transparent electrodes and subjected to orientation treatment by means of screen printing or a dispenser.

The other glass substrate is oppositely put on the glass substrate applied with the sealant composition and irradiated with rays such as UV rays under applying pressure to cure the sealant composition. Liquid crystal is charged between the two adhered glass substrates thus prepared through a liquid crystal-charging port in a vacuum, and then the charging port is sealed to prepare a liquid crystal display panel.

EXAMPLES

The present invention shall be explained below in detail with reference to examples and comparative examples. In the following examples, "part" and "%" are based on weight.

Synthetic Example 1: Synthesis of Rubber-Modified Unsaturated Compound (A-1)

Hydroxyethyl acrylate (HEA) of 160 parts was reacted with tolylenediisocyanate (TDI) of 240 parts at 70° C. for 2 hours to prepare a TDI/HEA adduct. Then, polypropylene glycol (PPG-2000) of 100 parts and dibutyltin dilaurate of 1.0 part were added to this adduct of 10 parts, and they were reacted at 80° C. for 4 hours to prepare an intermediate acrylate. Then, butyl acrylate of 6 parts, dodecylmercaptan of 0.2 part, glycidyl methacrylate of 2 parts, divinylbenzene of 0.2 part, azobisdimethylvaleronitrile of 0.5 part and azobisisobutyronitrile of 0.5 part were added to this intermediate acrylate of 60 parts, and they were polymerized at 80° C. for 2 hours. The preceding adduct of 100 parts, bisphenol A type epoxy resin diacrylate of 90 parts and neopentyl glycol diacrylate of 10 parts were added thereto to prepare an acrylic rubber-modified unsaturated compound (A-1).

This rubber-modified unsaturated compound forms a so-called sea/island structure in which the rubber particles having an average particle diameter of 0.2 μm are the islands and has a rubber content of 3.4% and a number average molecular weight of 3,500. These physical property values are summarized in Table 1.

Synthetic Example 2: Synthesis of Rubber-Modified Unsaturated Compound (A-2)

Polypropylene glycol (PPG-2000) of 100 parts and dibutyltin dilaurate of 1.0 part were added to a TDI/HEA adduct of 20 parts prepared by the same procedure as that of Synthetic Example 1, and they were reacted at 80° C. for 4 hours to prepare an intermediate acrylate. Then, butyl acrylate of 60 parts, dodecylmercaptan of 0.2 part, glycidyl methacrylate of 20 parts, divinylbenzene of 0.2 part, azobisdimethylvaleronitrile of 0.5 part and azobisisobutyronitrile of 0.5 part were added to this intermediate acrylate of 60 parts, and they were polymerized at 80° C. for 2 hours. The preceding adduct of 100 parts, bisphenol A type epoxy resin diacrylate of 90 parts and neopentyl glycol diacrylate of 10 parts were added thereto to prepare an acrylic rubber-modified compound (A-2).

This rubber-modified unsaturated compound forms a so-called sea/island structure in which the rubber particles having an average particle diameter of 0.5 $\mu$m are the islands and has a rubber content of 16.1% and a number average molecular weight of 7,000. These physical property values are summarized in Table 1.

Synthetic Example 3: Synthesis of Rubber-Modified Unsaturated Compound (A-3)

Butyl acrylate of 60 parts, dodecylmercaptan of 0.2 part, hydroxyethyl methacrylate of 20 parts, divinylbenzene of 0.2 part, azobisdimethylvaleronitrile of 0.5 part and azobisisobutyronitrile of 0.5 part were added to an intermediate acrylate of 52 parts prepared by repeating the same procedure as that of Synthetic Example 1, and they were polymerized at 80° C. for 2 hours. The preceding adduct of 100 parts, bisphenol A type epoxy resin diacrylate of 180 parts and neopentyl glycol diacrylate of 20 parts were added thereto. Further, a dehydration-condensation type silicone rubber of 200 parts was added thereto, and the reaction was continued for 2 hours while stirring strongly to prepare a silicone rubber/acrylic rubber-modified unsaturated compound (A-3).

This rubber-modified unsaturated compound forms a so-called sea/island structure in which the rubber particles having an average particle diameter of 4.5 $\mu$m are the islands and has a rubber content of 42.4% and a number average molecular weight of 78,000. These physical property values are summarized in Table 1.

Synthetic Example 4: Synthesis of Rubber-Modified Unsaturated Compound (A-4)

Radical-reactive silicone oil of 50 parts and azobisisobutyronitrile of 1.0 part were added to an intermediate acrylate of 60 parts prepared by repeating the same procedure as that of Synthetic Example 1, and they were reacted at 70° C. for 3 hours and further at 90° C. for 1 hour. The preceding adduct of 100 parts, bisphenol A type epoxy resin diacrylate of 90 parts and neopentyl glycol diacrylate of 10 parts were added thereto. Further, an ordinary temperature-curing type silicone rubber of 300 parts was added thereto, and the reaction was continued for 2 hours while stirring strongly to prepare a silicone rubber-modified unsaturated compound (A-4).

This rubber-modified unsaturated compound forms a so-called sea/island structure in which the rubber particles having an average particle diameter of 2.0 $\mu$m are the islands and has a rubber content of 25.2% and a number average molecular weight of 45,000. These physical property values are summarized in Table 1.

Synthetic Example 5: Synthesis of Rubber-Modified Unsaturated Compound (A-5)

A silicone compound of 20 parts having active hydrogen was reacted with an intermediate acrylate of 60 parts prepared by repeating the same procedure as that of Synthetic Example 1 with chloroplatinic acid used as a catalyst. Then, the ordinary temperature-curing type silicone rubber of 300 parts, bisphenol A type epoxy resin diacrylate of 250 parts and neopentyl glycol diacrylate of 50 parts were added thereto, and the reaction was continued for 2 hours while stirring strongly to prepare a silicone rubber-modified unsaturated compound (A-5).

This rubber-modified unsaturated compound forms a so-called sea/island structure in which the rubber particles having an average particle diameter of 0.8 $\mu$m are the islands and has a rubber content of 34.0% and a number average molecular weight of 15,000. These physical property values are summarized in Table 1.

Synthetic Example 6: Synthesis of Rubber-Modified Unsaturated Compound (A-6)

Butyl acrylate of 100 parts, dodecylmercaptan of 0.2 part, hydroxyethyl methacrylate of 50 parts, divinylbenzene of 0.5 part, azobisdimethylvaleronitrile of 1.0 part and azobisisobutyronitrile of 1.0 part were added to an intermediate acrylate of 52 parts prepared by repeating the same procedure as that of Synthetic Example 1, and they were polymerized at 80° C. for 2 hours. The preceding adduct of 100 parts, bisphenol A type epoxy resin diacrylate of 90 parts and neopentyl glycol diacrylate of 10 parts were added thereto. Further, the dehydration-condensation type silicone rubber of 400 parts was added thereto, and the reaction was continued for 2 hours while stirring strongly to prepare a silicone rubber/acrylic rubber-modified unsaturated compound (A-6).

This rubber-modified unsaturated compound forms a so-called sea/island structure in which the rubber particles having an average particle diameter of 7.3 $\mu$m are the islands and has a rubber content of 53.6% and a number average molecular weight of 108,000. These physical property values are summarized in Table 1.

Synthetic Example 7: Synthesis of Rubber-Modified Unsaturated Compound (A-7)

Polypropylene glycol (PPG-2000) of 100 parts and dibutyltin dilaurate of 1.0 part were added to a TDI/HEA adduct of 10 parts prepared by the same procedure as that of Synthetic Example 1, and they were reacted at 80° C. for 4 hours to prepare an intermediate acrylate. Then, butyl acrylate of 3 parts, dodecylmercaptan of 0.1 part, glycidyl methacrylate of 1 part, divinylbenzene of 0.1 part, azobisdimethylvaleronitrile of 0.5 part and azobisisobutyronitrile of 0.5 part were added to the intermediate acrylate of 60 parts, and they were polymerized at 80° C. for 2 hours. The preceding adduct of 100 parts, bisphenol A type epoxy resin diacrylate of 90 parts and neopentyl glycol diacrylate of 10 parts were added thereto to prepare an acrylic rubber-modified unsaturated compound (A-7).

This rubber-modified unsaturated compound forms a so-called sea/island structure in which the rubber particles having an average particle diameter of 0.1 $\mu$m are the islands and has a rubber content of 2.7% and a number average molecular weight of 950. These physical property values are summarized in Table 1.

TABLE 1

Physical property values of rubber-modified unsaturated compound

| | Synthetic Example | | | | | | |
|---|---|---|---|---|---|---|---|
| | 1 | 2 | 3 | 4 | 5 | 6 | 7 |
| Rubber-modified unsaturated compound | A-1 | A-2 | A-3 | A-4 | A-5 | A-6 | A-7 |
| Average particle diameter ($\mu$m) | 0.2 | 0.5 | 4.5 | 2.0 | 0.8 | 7.3 | 0.1 |
| Number average molecular weight | 3,500 | 7,000 | 78,000 | 45,000 | 15,000 | 108,000 | 950 |
| Rubber content (%) | 3.4 | 16.1 | 42.4 | 25.2 | 34.0 | 53.6 | 2.7 |

EXAMPLES 1 TO 5

Various components were blended with a mixer in the following proportion and kneaded by means of a ceramic-made three rolls mill until the particle diameter of the filler became 10 $\mu$m or less.

| | | |
|---|---|---|
| Rubber-modified unsaturated compound (A-1 to A-5) | 100 | parts |
| Coupling agent (vinyltrimethoxysilane, KBM-1003: brand name, manufactured by Shin-etsu Chemical Ind. Co., Ltd.) | 3 | parts |
| Filler (silica powder, Aerosil #380: brand name, manufactured by Nippon Aerosil Co., Ltd.) | 5 | parts |
| Filler (alumina powder, AL-45: brand name, manufactured by Showa Keikinzoku Co., Ltd.) | 10 | parts |
| Photopolymerization initiator (2-benzyl-2-dimethylamino-1-(4-morpholinophenyl)-butane-1-one, IRUGACURE 369: brand name, manufactured by Ciba Geigy Co., Ltd.) | 3 | parts |
| Photopolymerization initiator (diethylthioxanthone, Kayacure DETX: brand name, manufactured by Nippon Kayaku Co., Ltd.) | 0.2 | part |

This kneaded matter of 100 parts and a spacer (diameter 5 $\mu$m, milled fiber) of 3 parts were sufficiently blended at room temperature to obtain a resin composition for sealing liquid crystal cells.

Next, this resin composition was applied on a glass substrate (equipped with transparent electrodes and an orientation film). A screen printing method was used as an applying method. The other glass substrate was stuck thereon and compressed by means of a compression tool. Then, it was irradiated with UV rays to cure the composition to obtain a cell for sealing liquid crystal. In this case, with respect to the conditions for irradiation of UV rays, a metal halide lamp (one lamp, 160 watt/cm) was used, wherein a height of the lamp was 10 cm; the line speed was 1.0 m/minute; and the integrated luminous energy was 1,000 mJ/cm$^2$. All glasses used were barium borosilicate glasses (type number 7059, manufactured by Corning Corp.) subjected to silicon dioxide treatment.

Further, the cell for sealing liquid crystal thus obtained was charged with biphenyl type liquid crystal from a liquid crystal-charging port, and the charging port was sealed with Stract Bond ES-302 (brand name, manufactured by Mitsui Toatsu Chemicals Inc., two liquid type cold-setting epoxy resin) to prepare a liquid crystal panel.

The resulting resin compositions for sealing liquid crystal cells and liquid crystal panels were evaluated by the following tests, and the results thereof are shown in Table 3.

Workability: totally includes works carried out until the cell for sealing liquid crystal is completed, that is, the works in printing, sticking and curing by irradiation with UV rays. Among them, particularly the printing property (pattern holding property, air vent property and leveling property) was evaluated by four ranks:

⊚ excellent, ○ good, Δ slightly inferior, and × inferior.

Adhesive strength: the resin composition was applied patternwise on a glass substrate (50 mm×50 mm×1.1 mm thickness) by a screen printing method so that the resin composition was of a dimension of about 10 mm diameter×about 10 $\mu$m thickness in the center of the glass substrate after curing; the other glass substrate was stuck thereon and compressed by means of a compression tool, and then the substrates were irradiated with UV rays to cure the composition to obtain a test piece.

Next, three test pieces obtained were measured for a surface tensile adhesive strength (kg/cm2) immediately after preparing, after dipping in boiling water for 3 to 5 hours and after leaving for standing in a humid environment of 80° C. and 95% RH for 1,000 hours, respectively.

Electrical characteristic: the liquid crystal panels obtained were measured for a current between the terminals immediately after preparing and after leaving for standing in a humid environment of 80° C. and 95% RH for 1,000 hours, respectively, to determine the change rates thereof (times).

COMPARATIVE EXAMPLES 1 TO 6

The resin compositions for sealing liquid crystal, cells for sealing liquid crystal and liquid crystal panels were prepared in the same manners as those in Example 1, except that the resin compositions comprising the kinds and amounts shown in Table 2 were substituted for the rubber modified unsaturated compound (A-1) of 100 parts. The resulting resin compositions for sealing liquid crystal cells and liquid crystal panels were evaluated by the tests described above, and the results thereof are shown in Table 3.

TABLE 2

Compositions and physical property values of comparative examples (structural unit: parts)

|  | Comparative Example | | | | | |
|---|---|---|---|---|---|---|
|  | 1 | 2 | 3 | 4 | 5 | 6 |
| Rubber-modified unsaturated compound | | | | | | |
| A-2 | — | 2 | — | — | — | — |
| A-3 | — | — | 1 | — | — | — |
| A-6 | — | — | — | 50 | 100 | — |
| A-7 | — | — | — | — | — | 100 |
| Acrylate (*1) | 90 | 90 | 90 | 45 | — | — |
| Acrylate (*2) | 10 | 10 | 10 | 5 | — | — |
| Average particle diameter ($\mu$m) | — | 0.5 | 4.5 | 7.3 | 7.3 | 0.1 |
| Number average molecular weight | — | 7,000 | 78,000 | 108,000 | 108,000 | 950 |
| Rubber content (%) | — | 0.3 | 0.4 | 26.8 | 53.6 | 2.7 |

*1: Bisphenol A diacrylate (NK Ester BPE-200: brand name, manufactured by Shin Nakamura Chemical Co., Ltd.)
*2: Polyethyleneglycol diacrylate (NK Ester A-200: brand name, manufactured by Shin Nakamura Chemical Co., Ltd.)

TABLE 3

Evaluation results

| | | Adhesive strength (kgf/cm$^2$) | | | | Electrical characteristic |
|---|---|---|---|---|---|---|
| | | Immediately after | Dipped time in boiling water (hrs) | | Left in humid atmosphere | |
| | Workability | | 3 | 5 | 1000 (hrs) | (times) |
| Example | | | | | | |
| 1 | ○ | 266 | 258 | 254 | 261 | 1.04 |
| 2 | ⊚ | 322 | 316 | 312 | 326 | 1.02 |
| 3 | ○ | 288 | 291 | 272 | 275 | 1.11 |
| 4 | ⊚ | 336 | 326 | 321 | 324 | 1.01 |
| 5 | ○ | 263 | 268 | 265 | 266 | 1.05 |
| Comparative Example | | | | | | |
| 1 | x | 135 | 94 | 87 | 61 | 1.54 |
| 2 | Δ | 194 | 143 | 121 | 143 | 1.43 |
| 3 | Δ | 138 | 106 | 91 | 103 | 1.68 |
| 4 | x | 173 | 121 | 113 | 143 | 2.13 |
| 5 | x | 115 | 118 | 106 | 111 | 2.28 |
| 6 | x | 121 | 98 | 87 | 72 | 1.50 |

What is claimed is:

1. A resin composition for sealing liquid crystal cells comprising as essential components a rubber-modified unsaturated compound obtained by grafting a monomer having at least one polymerizable ethylenically unsaturated bond in a molecule with at least one rubber in an amount of 0.5 to 45.0% by weight and selected from acrylic rubber, silicone rubber, urethane rubber and conjugated diene rubber, and a coupling agent, a filler and a photopolymerization initiator wherein the composition cures to form rubber particles having an average particle diameter of 0.2 to 4.0 $\mu$m dispersed in a resin layer.

2. The resin composition for sealing liquid crystal cells as described in claim 1, wherein the rubber contained in the rubber-modified unsaturated compound has an average particle diameter of 0.2 to 2.0 $\mu$m.

3. The resin composition for sealing liquid crystal cells as described in claim 1, wherein the rubber contained in the rubber-modified unsaturated compound has a number average molecular weight of 1,000 to 100,000.

4. The resin composition for sealing liquid crystal cells as described in claim 1, wherein the rubber-modified unsaturated compound has a rubber content of 5 to 25% by weight based on the weight of the rubber-modified unsaturated compound.

5. A liquid crystal display panel, wherein a liquid crystal composition is sealed between two transparent substrates equipped with electrodes, and the peripheries of the substrates are adhered with the resin composition for sealing liquid crystal cells as described in claim 1.

* * * * *